No. 716,031. Patented Dec. 16, 1902.
H. N. B. GOOD.
PNEUMATIC TIRE.
(Application filed Mar. 17, 1902.)

(No Model.) 2 Sheets—Sheet 1.

No. 716,031. Patented Dec. 16, 1902.
H. N. B. GOOD.
PNEUMATIC TIRE.
(Application filed Mar. 17, 1902.)

(No Model.) 2 Sheets—Sheet 2.

Witnesses: Inventor:
H. N. B. Good.
by Wilkinson & Fisher
Attys.

UNITED STATES PATENT OFFICE.

HENRY NORTON BUTLER GOOD, OF LONDON, ENGLAND.

PNEUMATIC TIRE.

SPECIFICATION forming part of Letters Patent No. 716,031, dated December 16, 1902.

Application filed March 17, 1902. Serial No. 98,574. (No model.)

*To all whom it may concern:*

Be it known that I, HENRY NORTON BUTLER GOOD, a subject of the King of Great Britain, residing at 43 Whitehall Court, London, in the county of Middlesex, England, have invented new and useful Improvements in Pneumatic Tires, of which the following is a specification.

My invention relates to improvements in pneumatic tires for the wheels of motor-cars, bicycles, and other vehicles in which an inner india-rubber or other elastic tube is fitted around the rim of the wheel and inflated with air under considerable pressure, an outer flexible cover being fitted around the outer part of the inflated tube and having its edges strongly attached to the rim of the wheel.

The object of my improvements is to enable the pneumatic tire to be still used with sufficient efficiency after it has been accidentally punctured.

To more fully describe my invention, reference is had to the accompanying drawings, in which the same letters designate the same parts in the several views.

Figure 1:
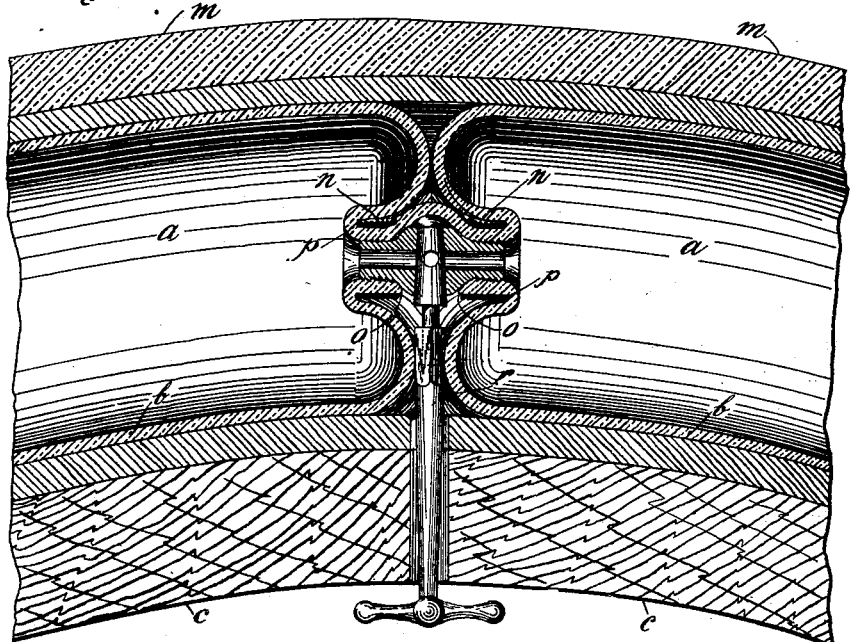
Figure 3:
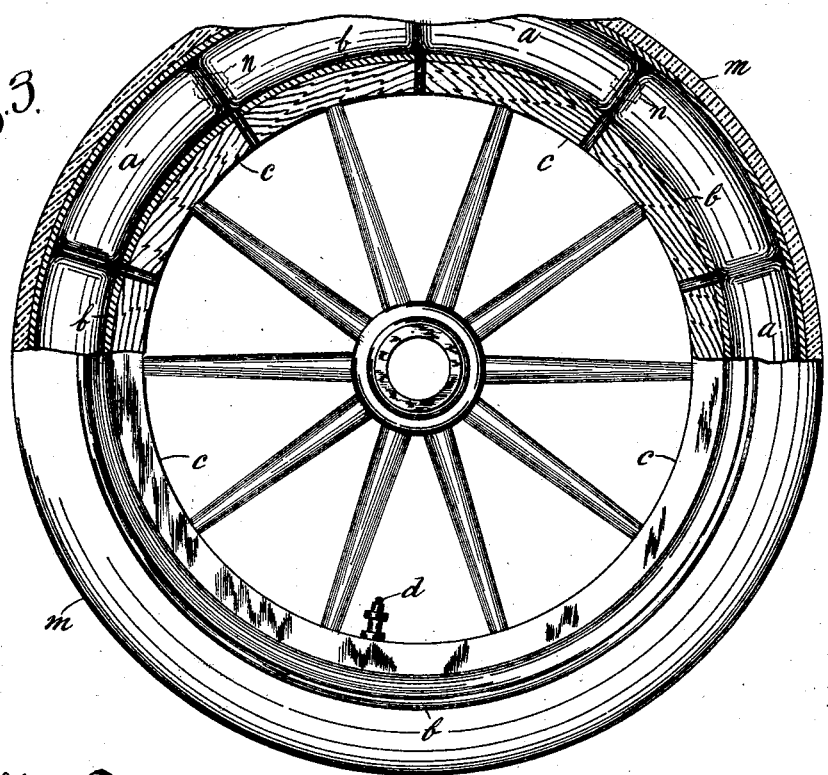
Figure 2:
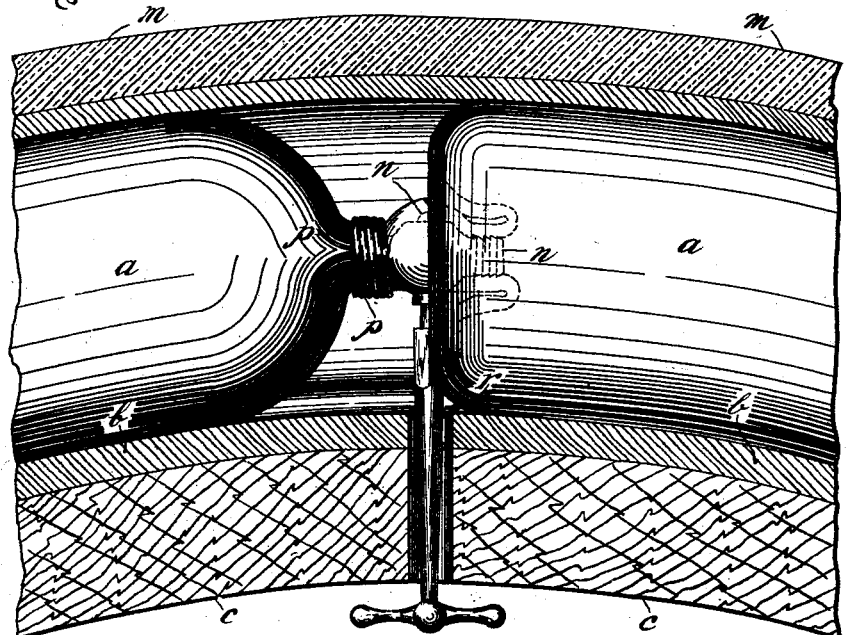

Figure 1 is a vertical longitudinal section of part of a motor-car wheel fitted with my pneumatic tire, the inner tube being shown inflated. Fig. 2 is a similar view showing the pneumatic tire partly inflated; and Fig. 3 is a side view on a smaller scale, partly in section, of a car-wheel fitted with my improved tire.

$a$ is the inner inflatable tube, of india-rubber, fitted to the metal tire $b$, which is itself fixed upon the wooden rim $c$ of the wheel.

$d$ is an inflating-valve of any suitable kind, and $m$ is the usual outer covering for the pneumatic tire.

$n$ is one of a number of small cocks arranged at suitable distances inside the tube $a$ for dividing the same into a plurality of inflatable compartments. These cocks $n$ are introduced through slits or holes $o$ in the flexible tube $a$ before the latter is inflated and are secured to the interior surface of the tube in any suitable manner—such, for instance, as by binding the tube to the cock by means of the wire $p$.

The plugs of the cocks $n$ are directed toward the center of the wheel, and through the metal tire $b$ and the wooden rim $c$ of the wheel holes are made opposite to each cock, into which keys $r$ can be introduced for the purpose of opening and closing the cocks $n$. The cocks $n$ being all opened, the tube $a$ is inflated through the inflating-valve $d$ and the cocks are then closed, the parts of the various sections of the tube adjoining the cocks $n$ being forced by the pressure of the air over the ends of the cocks and against each other, as shown in dotted lines in the right-hand part of Fig. 2 and also in Fig. 3. The left-hand part of Fig. 2 shows one of the compartments of the tube $a$ partly inflated. If one of the sections into which the tube $a$ is now divided becomes accidentally punctured, the air will slowly escape, while the compartments will remain fully inflated and the wheel can still be used without inconvenience.

It is obvious that in order to deflate the tire it will be simply necessary to open all the cocks and allow the air to escape through the inflation-valve $d$.

Having thus described my invention, what I claim, and desire to secure by Letters Patent of the United States, is—

1. In a pneumatic tire, the combination with the outer flexible covering, of an inner inflatable tube provided with a plurality of slits, valves inserted in said slits and secured to the interior surface of said tube, and means for closing said valves for separating said inner tube into a plurality of inflated compartments.

2. The combination, in a pneumatic tire, of the inner elastic tube $a$, cocks $n$, fixed in the tube $a$ by wire binding $p$, and key $r$, passing through holes in the metal tire $b$ and wheel-rim $c$, substantially as described and shown in the drawings.

In witness whereof I have hereunto set my hand in the presence of two witnesses.

HENRY NORTON BUTLER GOOD.

Witnesses:
ARTHUR E. EDWARDS,
ALFRED T. BRATTON.